United States Patent [19]

House et al.

[11] Patent Number: 5,009,798

[45] Date of Patent: * Apr. 23, 1991

[54] LOW FLUID LOSS HEAVY BRINES CONTAINING HYDROXYETHYL CELLULOSE

[75] Inventors: Roy F. House, Houston; Lonnie D. Hoover, Chappell Hill, both of Tex.

[73] Assignee: Baroid Technology, Inc., Houston, Tex.

[*] Notice: The portion of the term of this patent subsequent to Dec. 13, 2000, has been disclaimed.

[21] Appl. No.: 336,592

[22] Filed: Apr. 10, 1989

Related U.S. Application Data

[63] Continuation of Ser. No. 80,203, Jul. 29, 1987, abandoned, which is a continuation of Ser. No. 357,308, Mar. 11, 1982, abandoned, which is a continuation-in-part of Ser. No. 161,444, Jun. 20, 1980, Pat. No. 4,420,406.

[51] Int. Cl.$^5$ .............................................. E21B 43/00
[52] U.S. Cl. .................................. 252/8.551; 252/363.5
[58] Field of Search .................. 252/8.51, 8.514, 8.551, 252/363.5

[56] References Cited

U.S. PATENT DOCUMENTS

| | | | |
|---|---|---|---|
| 3,675,717 | 7/1972 | Goins et al. | 166/278 |
| 4,046,197 | 9/1977 | Gruesbeck et al. | 252/8.51 X |
| 4,304,677 | 12/1981 | Stauffer et al. | 252/8.551 |
| 4,330,414 | 5/1982 | Hoover | 252/8.51 |
| 4,350,601 | 9/1982 | Mosier et al. | 252/8.551 |
| 4,392,964 | 7/1983 | House et al. | 252/8.551 X |
| 4,415,463 | 11/1983 | Mosier et al. | 252/8.551 |
| 4,420,406 | 12/1983 | House et al. | 252/8.551 |

FOREIGN PATENT DOCUMENTS 2000799 1/1979 United Kingdom ............ 252/363.5

*Primary Examiner*—George A. Suchfield
*Attorney, Agent, or Firm*—Browning, Bushman, Anderson & Brookhart

[57] ABSTRACT

Disclosed are heavy brine compositions containing zinc bromide and one or more soluble salts selected from the group consisting of calcium chloride and calcium bromide, preferably having a density in the range from about 14.2 to about 16.0 pounds per gallon, which have a low API fluid loss. Also disclosed is a method of formulating certain heavy brines in which hydroxyethyl cellulose functions as a fluid loss additive.

8 Claims, No Drawings

LOW FLUID LOSS HEAVY BRINES CONTAINING HYDROXYETHYL CELLULOSE

This is a continuation of co-pending U.S. application Ser. No. 07/080,203 filed on July 29, 1987, now abandoned, which, in turn, in a continuation of U.S. application Ser. No. 06/357,308, filed Mar. 11, 1982, now abandoned, which is a continuation-in-part of U.S. application Ser. No. 06/161,444 filed June 20, 1980, now U.S. Pat. No. 4,420,406.

BACKGROUND OF THE INVENTION

The present invention relates to heavy brine solutions containing zinc bromide and at least one soluble salt selected from the group consisting of calcium chloride and calcium bromide, and, in particular, to such brines having a low fluid loss containing hydroxyethyl cellulose.

In recent years, the practical operating range of clear brines for use in the oil and gas industry has been significantly extended by utilizing soluble zinc salts, particularly zinc bromide, so that the advantages of clear brines can now be obtained with fluids having densities as high as 19.2 pounds per gallon at ambient temperatures and pressures.

The high density clear brines are used extensively: as completion fluids to minimize plugging of perforation tunnels, to protect formation permeability and to minimize mechanical problems; as workover fluids, for the same reasons; as packer fluids, to allow easy movement and retrieval of the packer; for underreaming, gravel-pack and sand consolidation applications; as kill fluid or ballast fluid; for wire-line work; and as drilling fluids.

Clear brines having a density of 14.2 pounds per gallon (ppg) or lower are generally formulated to contain sodium chloride, sodium bromide, potassium chloride, calcium chloride, calcium bromide, or mixtures of these salts. Clear brines having a density up to about 15.1 ppg can be formulated with calcium chloride and calcium bromide; however, if the brine must have a low crystallization temperature, then clear brines in this density range are generally formulated to contain a soluble zinc salt. Zinc bromide is preferred because brines containing it are less corrosive than brines containing zinc chloride. Clear brines having a density greater than about 15.1 ppg are formulated to contain zinc bromide.

Generally, hydroxyethyl cellulose (HEC) and xanthan gum polymers are compatible with the fluids which do not contain zinc salts. However, at the higher densities, the hydration of the viscosifiers is significantly slower. HEC is generally considered as unsatisfactory for use in fluids containing zinc salts.

SUMMARY OF THE INVENTION

We have now found that HEC will function as a fluid loss additive in certain heavy brines in which HEC does not function efficiently as a viscosifier. These heavy brines contain either:

(1) from about 16% to about 20% by weight zinc bromide; or (2) greater than 20% zinc bromide and a concentration of calcium chloride of at least $(2X-33)\%$ by weight, were $X = \%$ zinc bromide.

It is, therefore, an object of this invention to provide certain heavy brine solutions containing zinc bromide and at least one soluble salt selected from the group consisting of calcium chloride and calcium bromide, and a fluid loss reducing amount of hydroxyethyl cellulose.

Another object of this invention is to provide heavy brine solutions having a density in the range from about 14.2 to about 16.0 ppg containing zinc bromide and at least one soluble salt selected from the group consisting of calcium chloride and calcium bromide, and a fluid loss reducing amount of hydroxyethyl cellulose.

Still another object of this invention is to provide a method of decreasing the fluid loss of heavy brines having a density in the range from about 14.2 to about 16.0 ppg containing zinc bromide and at least one soluble salt selected from the group consisting of calcium chloride and calcium bromide.

DESCRIPTION OF THE PREFERRED EMBODIMENT

The heavy brines for use in the present invention contain zinc bromide and at least one soluble salt selected from the group consisting of calcium chloride and calcium bromide.

In one embodiment of the invention, the concentration of zinc bromide must be in the range from about 16% to about 20% by weight. Preferably the concentration of zinc bromide is $<18\%$ and the concentration of calcium chloride is $<5(X-17)\%$ where X is the % of zinc bromide.

In another embodiment of the invention, the brine must contain greater than 20% by weight zinc bromide and a concentration of calcium chloride of at least $(2X-33)\%$ by weight, where X is the % of zinc bromide.

The preferred brines have a density in the range from about 14.2 to about 16.0 ppg.

Generally, heavy brines are prepared by mixing together various standard commercially available brines, as follows: calcium chloride brines having a density in the range from about 11.0 to about 11.6 ppg; calcium bromide brine having a density of 14.2 ppg; and a calcium bromide/zinc bromide solution having a density of 19.2 ppg containing about 20% calcium bromide and about 57% zinc bromide. Solid calcium chloride and solid calcium bromide are also used in conjunction with these brines to prepare the heavy brines for use in this invention. However, it is preferred to utilize only liquid solutions to formulate the brines in the practice of this invention. Standard brine mixing/preparation tables are available from the various manufacturers and suppliers of these commercially available brines.

The HEC polymers which are useful as fluid loss control agents in the present invention are solid, particulate materials which are water soluble or water dispersible gums and which upon solution or dispersion in an aqueous medium increase the viscosity of the system. HEC polymers are generally high yield, water soluble, non-ionic materials produced by treating cellulose with sodium hydroxide followed by reaction with ethylene oxide. Each anhydroglucose unit in the cellulose molecule has three reactive hydroxy groups. The average number of moles of the ethylene oxide that becomes attached to each anhydroglucose unit in cellulose is called moles of substituent combined. The average number of hydroxyls of each anhydroglucose unit which is reacted with ethylene oxide is called the degree of substitution. In general, it is preferable to use HEC polymers having a mole substitution greater than 1.

Usually, upon the addition of dry, powdered hydrophilic polymers, such as HEC, to water, the polymer particles undergo hydration preventing the interior of the particle from readily hydrating, solvating or otherwise dispersing in the aqueous medium. Accordingly, high shear, long mixing times and/or elevated temperatures must be applied in order to obtain a homogeneous system.

We have found that HEC and other hydrophilic polymers can be activated such that the polymers will viscosify heavy brines at ambient temperatures. Activated HEC compositions, and methods for activating HEC, are disclosed in the following listed co-pending patent applications incorporated herein by reference for all purposes: Ser. No. 119,805 filed Feb. 8, 1980, now U.S. Pat. No. 4,330,414, entitled Dispersible Hydrophilic Polymer Compositions; and Ser. No. 146,286 filed May 5, 1980, now U.S. Pat. No. 4,392,964, entitled Compositions and Method for Thickening Aqueous Brines. Methods of activating other hydrophilic polymers are disclosed in co-pending patent application Ser. No. 196,367 filed Oct. 14, 1980, now U.S. Pat. No. 4,427,556, entitled Dispersible Hydrophilic Polymer Compositions, incorporated herein by reference for all purposes.

Activated HEC compositions comprise:

(1) HEC, a solvating agent comprising a water miscible, polar organic liquid which when uniformly mixed with HEC in a weight ratio of HEC to solvating agent of 1:2 produces a mixture with substantially no free liquid solvating agent present after remaining quiescent for one week at ambient temperature in a sealed container, and a diluting agent comprising an organic liquid which is not a solvating agent; and (2) HEC, an aqueous liquid, and a water soluble polar organic liquid which when uniformly mixed with HEC in a weight ratio of HEC to polar organic liquid of 1:2 produces a mixture with free liquid present after remaining quiescent for one week at ambient temperature in a sealed container. Preferably the aqueous liquid has a pH greater than 7.0.

Generally speaking, it has been found that virtually any organic compound which passes the solvation test described above, will function, to a usable degree, as a solvation agent. Non-limiting but preferred solvating agents include: aliphatic glycols containing from 2 to 5 carbon atoms such as ethylene glycol, 1,2-propanediol, 1,4-butanediol, 1,3-pentanediol and the like; alkylene triols containing from 2 to 6 carbon atoms such as glycerol, 1,2,3-butane-triol, 1,2,3-pentanetriol, and the like; amides containing from 1 to 4 carbon atoms such as formamide, acetamide, dimethyl formamide, and the like; and the mixtures of the various above compounds.

The diluting agent, in general, will be any liquid organic compound or material which is not a solvating agent. In general, the diluting agents are liquids which do not appreciably swell the HEC polymers, i.e. they do not produce semisolid or viscous mixtures which have no free liquid present after the one week solvation period described in the above test for determining solvating agents. Non-limiting examples of diluting agents include liquid aliphatic and aromatic hydrocarbons containing from 5 to 10 carbon atoms; kerosene, diesel oil, isopropanol, alkylene glycol ethers, vegetable oils, etc. Particularly preferred are organic liquids which are water soluble or miscible most preferably alkanols having at least 3 carbon atoms, ethylene glycol monoalkyl ethers, dialkylene glycol monoalkyl ethers, and the like.

The diluting agent will maintain the polymeric composition in a liquid, pourable state at a temperature of about 20° C. It will be understood, however, that lesser amounts of diluting agent can be used if desired and that the ultimate amount of diluting agent employed will depend upon the type of shear which is available to disperse the thickener. In general it has been found that desirable thickeners, which are pourable liquids, can be produced from compositions containing from about 10 to about 25% by weight HEC polymer, from about 2 to about 70% by weight diluting agent, and from about 5 to about 88% solvating agent.

HEC has been added to heavy brines to increase the viscosity of the brine such that the rate of loss of the brine to the formation contacted by the brine is reduced. Normally, in the absence of bridging particles, hydroxyethyl cellulose provides poor fluid loss control in those brines in which the HEC is fully hydrated. See for example co-pending patent application Ser. No. 161,444 filed June 20, 1980, entitled Thickened Heavy Brines, incorporated herein by reference.

We have found, as disclosed in co-pending patent application Ser. No. 161,444 filed June 20, 1980, that if the concentration of zinc bromide is less than about 20% by weight, the HEC will not efficiently gel or viscosify the brine. Indeed, we have found that while it is possible to viscosify a brine containing no zinc bromide or a brine solution containing a high concentration of zinc bromide, with HEC, if the two thickened solutions are admixed to produce a solution containing zinc bromide in less than about a 20% by weight concentration, the viscosity of the mixed brine will be essentially the same as if no HEC is present.

As indicated herein, it is a feature of this invention that HEC functions as an excellent fluid loss control additive in certain heavy brines in which the HEC is a very inefficient viscosifier. The HEC containing brines of this invention are cloudy or opaque as compared to the clear brines obtained when the HEC is completely, or nearly completely, hydrated. Apparently the HEC is not completely solubilized in these brines and thus at least a portion of the HEC is available to act as a bridging agent to decrease the fluid loss of these brines.

It is preferred in the practice of this invention that the HEC be activated such that the HEC will hydrate in these heavy brines at ambient temperature.

The concentration of HEC need only be sufficient to reduce the fluid loss of the brine. Preferably, the concentration of HEC will be from about 0.25 to about 5.0 ppb, more preferably, from about 0.25 to about 3.0 ppb.

It is another embodiment of this invention to provide a method of decreasing the fluid loss of heavy brines containing zinc bromide and at least one soluble salt selected from the group consisting of calcium chloride and calcium bromide, which comprises formulating the brine to contain from about 16% to about 20% by weight zinc bromide, and mixing with the brine a fluid loss reducing amount of HEC, as disclosed hereinbefore.

Still another embodiment of this invention provides a method of decreasing the fluid loss of heavy brines containing zinc bromide, calcium chloride, and calcium bromide, which comprises formulating the brine to contain greater than 20% zinc bromide and a concentration of calcium chloride of at least $(2X-33)\%$ by weight, where X is the % of zinc bromide, and mixing with the brine a fluid loss reducing amount of HEC, as disclosed hereinbefore.

To more fully illustrate the invention, the following nonlimiting examples are presented.

Examples of the Invention

Heavy brines having the compositions listed in Table 1 were prepared by mixing together the indicated amounts of the following materials: a 19.2 ppg calcium bromide/zinc bromide solution containing 20% calcium bromide and 57% zinc bromide; a 14.2 ppg calcium bromide solution containing 53% calcium bromide; an 11.6 ppg calcium chloride solution containing 37.6% calcium chloride; and calcium chloride pellets containing 95% calcium chloride. After cooling to room temperature, there were added either: 3 ppb of NATROSOL 250 HHR hydroxyethyl cellulose; or 3 ppb of activated NATROSOL 250 HHR (i.e., 15 ppb of a composition containing 20% HEC, 25% glycerin, 54.6% isopropanol, and 0.4% CAB-O-SIL M5). Thereafter, the heavy brines were rolled 16 hours at room temperature and the API RP 13B rheology and fluid loss obtained. The heavy brines were then rolled 16 hours at 150°F, cooled at room temperature, and the API RP 13B data again obtained. The data obtained are given in Table 2.

The data indicate that heavy brines containing HEC can be formulated to exhibit a very low API fluid loss provided the % zinc bromide in the brine is in the range from about 16% to about 20% by weight, or the % zinc bromide is greater than 20% and the calcium chloride is greater than $(2X-33)\%$ where X is the % of zinc bromide in the brine. Preferably, the % zinc bromide is in the range from about 18% to about 20% and the % calcium chloride is less than about $5(X-17)\%$. In this preferred range the HEC solublizes to such an extent that appreciable viscosity is imparted to the heavy brine. The data also indicate that it is preferable to omit any solid calcium chloride from the heavy brine.

TABLE 1

| | | | Brine Compositions | | | | | |
|---|---|---|---|---|---|---|---|---|
| Brine Number | Density ppg. | % ZnBr$_2$ | % CaCl$_2$ | % CaBr$_2$ | 19.2 ppg. bbl. | 11.6 ppg. bbl. | 14.2 ppg. bbl. | 95% CaCl$_2$ lb. |
| 1 | 15.0 | 0 | 16.3 | 43.3 | 0 | 0.0285 | 0.8637 | 103 |
| 2 | 15.0 | 0 | 16.3 | 43.3 | 0 | 0.0285 | 0.8637 | 103 |
| 3 | 15.3 | 5.1 | 14.9 | 41.2 | 0.0714 | 0.0271 | 0.8014 | 95.7 |
| 4 | 15.3 | 5.1 | 14.9 | 41.2 | 0.0714 | 0.0271 | 0.8014 | 95.7 |
| 5 | 15.0 | 11.7 | 0 | 46.2 | 0.160 | 0 | 0.840 | 0 |
| 6 | 15.0 | 11.7 | 0 | 46.2 | 0.160 | 0 | 0.840 | 0 |
| 7 | 15.8 | 13.2 | 12.5 | 38.0 | 0.190 | 0.0229 | 0.700 | 83.4 |
| 8 | 15.8 | 13.2 | 12.5 | 38.0 | 0.190 | 0.0229 | 0.700 | 83.4 |
| 9 | 15.3 | 15.7 | 0 | 43.9 | 0.220 | 0 | 0.780 | 0 |
| 10 | 15.3 | 15.7 | 0 | 43.9 | 0.220 | 0 | 0.780 | 0 |
| 11 | 15.3 | 16.0 | 0 | 43.7 | 0.224 | 0 | 0.776 | 0 |
| 12 | 14.8 | 16.0 | 5.0 | 36.8 | 0.217 | 0.170 | 0.613 | 0 |
| 13 | 14.4 | 16.0 | 10.0 | 29.6 | 0.2105 | 0.330 | 0.4595 | 0 |
| 14 | 16.0 | 16.3 | 11.6 | 36.7 | 0.238 | 0.0214 | 0.658 | 78.5 |
| 15 | 16.0 | 16.3 | 11.6 | 36.7 | 0.238 | 0.0214 | 0.658 | 78.5 |
| 16 | 15.4 | 17.0 | 0 | 43.1 | 0.239 | 0 | 0.761 | 0 |
| 17 | 14.9 | 17.0 | 5.0 | 36.1 | 0.2317 | 0.171 | 0.5973 | 0 |
| 18 | 15.5 | 18.0 | 0 | 42.5 | 0.255 | 0 | 0.745 | 0 |
| 19 | 15.0 | 18.0 | 5.0 | 35.5 | 0.2465 | 0.172 | 0.5815 | 0 |
| 20 | 14.75 | 18.0 | 7.5 | 32.0 | 0.2427 | 0.2537 | 0.5036 | 0 |
| 21 | 14.5 | 18.0 | 10.0 | 28.5 | 0.239 | 0.334 | 0.427 | 0 |
| 22 | 15.5 | 18.4 | 0 | 42.4 | 0.260 | 0 | 0.740 | 0 |
| 23 | 15.5 | 18.4 | 0 | 42.4 | 0.260 | 0 | 0.740 | 0 |
| 24 | 15.5 | 19.0 | 0 | 42.1 | 0.270 | 0 | 0.730 | 0 |
| 25 | 15.1 | 19.0 | 5.0 | 34.8 | 0.2615 | 0.1735 | 0.565 | 0 |
| 26 | 14.6 | 19.0 | 10.0 | 28.0 | 0.2535 | 0.3335 | 0.413 | 0 |
| 27 | 14.25 | 19.0 | 14.0 | 22.3 | 0.2474 | 0.4573 | 0.2953 | 0 |
| 28 | 15.6 | 20.0 | 0 | 41.5 | 0.2855 | 0 | 0.7145 | 0 |
| 29 | 14.8 | 20.0 | 8.0 | 30.2 | 0.2714 | 0.2729 | 0.4557 | 0 |
| 30 | 14.8 | 20.0 | 8.0 | 30.2 | 0.2714 | 0.2729 | 0.4557 | 0 |
| 31 | 14.3 | 20.0 | 14.0 | 21.7 | 0.2614 | 0.460 | 0.2786 | 0 |
| 32 | 14.3 | 20.0 | 14.0 | 21.7 | 0.2614 | 0.460 | 0.2786 | 0 |
| 33 | 16.0 | 22.0 | 11.7 | 31.0 | 0.3214 | 0.120 | 0.4957 | 59.3 |
| 34 | 16.0 | 22.0 | 11.7 | 31.0 | 0.3214 | 0.120 | 0.4957 | 59.3 |
| 35 | 14.6 | 22.0 | 12.0 | 23.4 | 0.2943 | 0.4028 | 0.3029 | 0 |
| 36 | 14.6 | 22.0 | 12.0 | 23.4 | 0.2943 | 0.4028 | 0.3029 | 0 |
| 37 | 14.4 | 22.0 | 14.0 | 20.7 | 0.290 | 0.4628 | 0.2472 | 0 |
| 38 | 14.4 | 22.0 | 14.0 | 20.7 | 0.290 | 0.4628 | 0.2472 | 0 |

TABLE 2

| | Brine Evaluation | | | | | | | |
|---|---|---|---|---|---|---|---|---|
| | 3 ppb. NATROSOL 250 HHR[1] | | | | | | | |
| | 16 Hours @ 74° F. | | | | 16 Hours @ 150° F. | | | |
| Brine Number | Rheology | | | API Fluid Loss[2] | API Rheology | | | API Fluid Loss |
| | 600 | 300 | 3 | | 600 | 300 | 3 | |
| 1 | >300 | >300 | 130 | 23 | >300 | >300 | 149 | 60 |
| 2 | (68) | (35) | (0) | (20) | (>300) | (>300) | (69) | (80) |
| 3 | 56 | 29 | 2 | 125 | 67 | 34 | 1 | NC |
| 4 | (62) | (31) | (0) | (NC) | (60) | (30) | (1) | (187) |
| 5 | 15 | 8 | 0 | NC | 32 | 16 | 0 | 3 |

TABLE 2-continued

Brine Evaluation
3 ppb. NATROSOL 250 HHR[1]

| Brine Number | 16 Hours @ 74° F. | | | | 16 Hours @ 150° F. | | | |
|---|---|---|---|---|---|---|---|---|
| | Rheology | | | API Fluid Loss[2] | API Rheology | | | API Fluid Loss |
| | 600 | 300 | 3 | | 600 | 300 | 3 | |
| 6 | (14) | (7) | (0) | (NC) | (16) | (8) | (0) | (18) |
| 7 | 51 | 26 | 0 | 131 | 63 | 32 | 2 | NC |
| 8 | (49) | (25) | (0) | NC) | (51) | (26) | (0) | (150) |
| 9 | 24 | 12 | 0 | NC | 98 | 36 | 1 | 1 |
| 10 | (15) | (7) | (0) | (NC) | 40 | (24) | (2) | (4) |
| 11 | 44 | 23 | 1 | 22 | 58 | 30 | 1 | 1 |
| 12 | 24 | 11 | 0 | NC | 33 | 15 | 0 | 4 |
| 13 | 21 | 11 | 0 | NC | 44 | 17 | 0 | 9.5 |
| 14 | 50 | 25 | 0 | 103 | 63 | 31 | 0 | NC |
| 15 | (52) | (26) | (0) | (NC) | (49) | (25) | (0) | (120) |
| 16 | 42 | 22 | 0 | 5 | 61 | 34 | 3 | 1 |
| 17 | 32 | 16 | 1 | 25 | 55 | 30 | 2 | 1 |
| 18 | 222 | 153 | 35 | 1 | 283 | 198 | 37 | 1 |
| 19 | 162 | 106 | 15 | 1 | 192 | 127 | 11 | 1 |
| 20 | 31 | 15 | 0 | 50 | 47 | 25 | 3 | 1 |
| 21 | 57 | 31 | 1 | 16 | 62 | 32 | 1 | 2 |
| 22 | 205 | 158 | 33 | 1 | >300 | 184 | 44 | 1 |
| 23 | (15) | (8) | (1) | (NC) | (50) | (25) | (1) | (2) |
| 24 | 222 | 196 | 52 | 1 | >300 | 227 | 59 | 1 |
| 25 | 193 | 161 | 39 | 1 | 274 | 198 | 46 | 1 |
| 26 | 158 | 104 | 12 | 1 | 187 | 120 | 10 | 1 |
| 27 | 41 | 21 | 0 | 4 | 52 | 28 | 1 | 1 |
| 28 | 202 | 218 | 57 | 1 | >300 | 249 | 76 | 1 |
| 29 | 230 | 161 | 34 | 0 | 264 | 205 | 41 | 3 |
| 30 | (14) | (8) | (0) | (NC) | (63) | (33) | (1) | (1) |
| 31 | 152 | 101 | 9 | 1 | >300 | 233 | 57 | 5 |
| 32 | (14) | (7) | (0) | (NC) | (48) | (24) | (1) | (2) |
| 33 | 46 | 23 | 1 | 29 | 172 | 101 | 5 | 1 |
| 34 | (37) | (19) | (0) | (NC) | (47) | (24) | (0) | (2) |
| 35 | 234 | 191 | 42 | 4 | 212 | 197 | 44 | 4 |
| 36 | (16) | (8) | (0) | (NC) | (103) | (59) | (1) | (0.5) |
| 37 | 229 | 170 | 39 | 2 | 213 | 140 | 11 | 5 |
| 38 | (16) | (8) | (0) | (NC) | (77) | (41) | (1) | (0.2) |

[1]Data in parentheses obtained using dry, powdered NATROSOL 250 HHR
[2]NC = No Control The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalence of the claims are therefore intended to be embraced therein.

We claim:

1. A method of decreasing the fluid loss of heavy brines containing zinc bromide and at least one soluble salt selected from the group consisting of calcium chloride and calcium bromide, which comprises sequentially carrying out the steps of adjusting the concentration of zinc bromide in said brine to the range from about 16% to about 20% by weight, and mixing with said brine a fluid loss reducing amount of hydroxyethyl cellulose which has been activated by admixing said hydroxyethyl cellulose with an aqueous liquid having a pH of greater than 7 and a water-soluble polar organic liquid which when uniformly mixed with hydroxyethyl cellulose in a weight ratio of hydroxyethyl cellulose to polar organic liquid of 1:2 produces a mixture with free liquid present after remaining quiescent for one week at ambient temperature in a sealed container, said hydroxyethyl cellulose being incompletely solubilized in said brine whereby a portion of said hydroxyethyl cellulose acts as a bridging agent.

2. The method of claim 1 wherein said brine has a density in the range from about 14.2 to about 16.0 pounds per gallon.

3. The method of claim 2 wherein the concentration of hydroxyethyl cellulose is from about 0.25 to about 5.0 pounds per 42 gallon barrel.

4. The method of claim 2 wherein the concentration of hydroxyethyl cellulose is from about 0.25 to about 3.0 pounds per 42 gallon barrel.

5. A method of decreasing the fluid loss of heavy brine containing zinc bromide calcium chloride, and calcium bromide, which comprises adjusting the concentration of zinc bromide in said brine to greater than 20% by weight, adjusting the concentration of calcium chloride in said brine to at least (2X−33)% by weight, where X is the % by weight of zinc bromide, and mixing with said brine a fluid loss reducing amount of hydroxyethyl cellulose, the concentration of zinc bromide being adjusted prior to mixing said brine with said hydroxyethyl cellulose which has been activated by admixing said hydroxyethyl cellulose with an aqueous liuqid having a pH of greater than 7 and a water-soluble polar organic liquid which when uniformly mixed with hydroxyethyl cellulose in a weight ratio of hydroxyethyl cellulose to polar organic liquid of 1:2 produces a mixture with free liquid present after remaining quiescent for one week at ambient temperature in a sealed container, the concentration of zinc bromide being adjusted prior to mixing said brine with said hydroxyethyl cellulose, said hydroxyethyl cellulose being incompletely solubilized in said brine whereby a portion of said hydroxyethyl cellulose acts as a bridging agent.

6. The method of claim 5 wherein said brine has a density in the range from about 14.2 to about 16.0 pounds per gallon.

7. The method of claim 6 wherein the concentration of hydroxyethyl cellulose is from about 0.25 to about 5.0 pounds per 42 gallon barrel.

8. The method of claim 6 wherein the concentration of hydroxyethyl cellulose is from about 0.25 to about 3.0 pounds per 42 gallon barrel.

* * * * *